United States Patent [19]

Sakurai

[11] Patent Number: 5,641,218

[45] Date of Patent: Jun. 24, 1997

[54] OPTICAL PANEL FOR USE IN FLASHING DEVICE

[75] Inventor: Hidenori Sakurai, Hachioji, Japan

[73] Assignee: Olympus Optical Co., Ltd., Tokyo, Japan

[21] Appl. No.: 445,880

[22] Filed: May 22, 1995

[30] Foreign Application Priority Data

May 24, 1994 [JP] Japan .................................. 6-109833

[51] Int. Cl.$^6$ ............................................... G03B 15/05
[52] U.S. Cl. ........................... 362/16; 362/223; 362/328; 362/330; 362/332
[58] Field of Search ..................... 362/16, 17, 326, 362/330, 332, 223, 328, 336; 359/654, 741, 742, 743

[56] References Cited

U.S. PATENT DOCUMENTS

| | | | |
|---|---|---|---|
| 3,486,808 | 12/1969 | Hamblen | 359/654 |
| 4,172,273 | 10/1979 | Schilling et al. | 362/17 |
| 4,333,127 | 6/1982 | Alkema et al. | 362/223 |
| 4,778,256 | 10/1988 | Serizawa | 359/654 |
| 5,160,192 | 11/1992 | Sugawara | 362/16 |

FOREIGN PATENT DOCUMENTS

56-145050  11/1981  Japan .
4-138438   5/1992   Japan .

*Primary Examiner*—Ira S. Lazarus
*Assistant Examiner*—Sara Sachie Raab
*Attorney, Agent, or Firm*—Louis Weinstein

[57] ABSTRACT

A flashing device having an optical panel 3 to converge light, emitted from a flashing discharge tube 1, and reflected from a reflector 2, the converged light being directed by the optical panel to a photographic object. The optical panel is placed in front of the flashing discharge tube 1 and reflector 2 so as to control the light distribution in a transverse direction perpendicular to the axis of the flashing discharge tube 1. Moreover, the optical panel has different optical characteristics at its central portion and circumferential portion in the transverse direction perpendicular to the axis of the flashing discharge tube 1.

11 Claims, 8 Drawing Sheets

OPTICAL PANEL FOR USE IN FLASHING DEVICE

BACKGROUND OF THE INVENTION

1. Field of the Invention

The present invention relates to an optical panel for use in a flashing device, and more particularly to an optical panel for a flashing device employing a flashing system wherein a hat-like reflector condenses light emitted from a flashing discharge tube and illuminates a photographic object, as well as controlling light distribution characteristics.

2. Related Background Art

Figure 7:
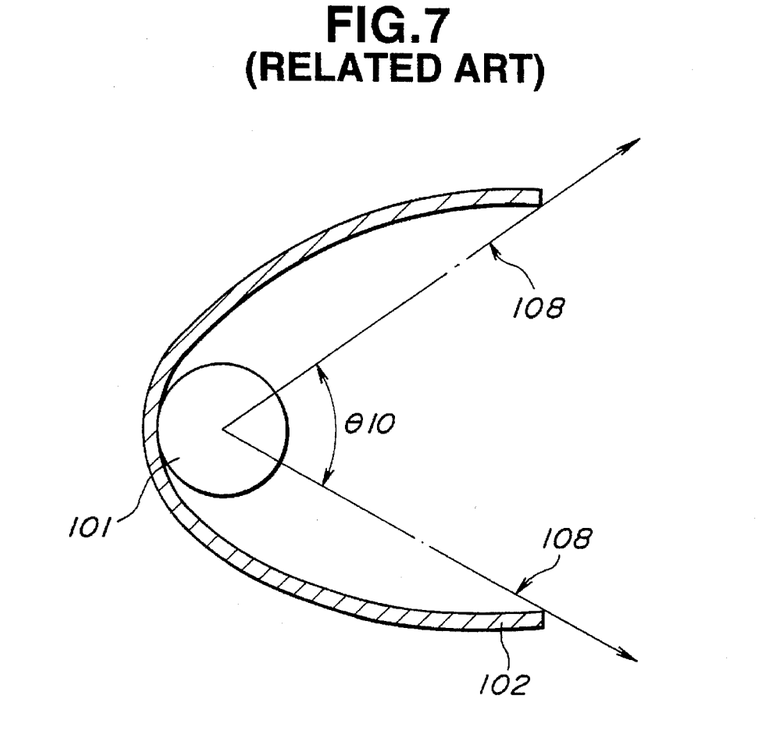
FIG. 7 is a longitudinal cross-sectional view schematically showing a prior flashing device.

Flashing devices which condense light from a flashing discharge tube and illuminate a photographic object have heretofore been proposed and generally put into practical use. For example, a conventional flashing device as shown in FIG. 7 is made up of a flashing discharge tube 101 and a reflector 102 and provides an illuminating angle made between a line connecting the center of the flashing discharge tube 101 with an upper end portion of the reflector 102 and a line connecting the center of the flashing discharge tube 101 with a lower end portion thereof, i.e., defined by a diverging angle θ10 of direct light 108 from the flashing discharge tube.

On the other hand, various flashing devices have also been put in practical use, wherein an optical panel or the like is disposed in front of the flashing discharge tube and reflector to control light distribution characteristics for the purpose of converging the light from the flashing discharge tube within a desired illuminating angle.

For instance, in an optical panel for a flashing device as disclosed in Japanese Laid-Open Utility Model No.145030 of 1981, first control structures having an excellent light distribution characteristic at a circumferential portion of a reflector are arranged in front of and at both sides of the reflector with respect to its longitudinal direction and a second control structure having a great light distribution characteristic at a central portion of the reflector is placed at a central portion between the first control structures so that different light distribution characteristics are provided for the central portion and circumferential portion. This arrangement can converge light, directed at a circumferential portion of a photographic object along a longitudinal direction of the reflector, to a central portion thereof.

In addition, a flashing device, as disclosed in Japanese Laid-Open Patent Application No. 138438 of 1992, is equipped with a prism having a positive refractive surface, an incident surface for receiving light advancing toward side-way portions of a light-emitting source (flashing discharge tube), a total reflection surface for total-reflection of the light incident on the reflection surface, and an emission surface for forwardly emitting the light total-reflected by the total reflection surface. In addition, at different areas the flashing device is attendant with an emission opening for the direct light advancing forwardly without passing through the prism and another emission opening for the reflected light proceeding forwardly through the prism. According to this flashing device, divergent light, emitted from the light-emitting source (flashing discharge tube) but not directly reaching a photographic object, passes through the prism, thereby being converged into an illuminating angle.

Figure 8:
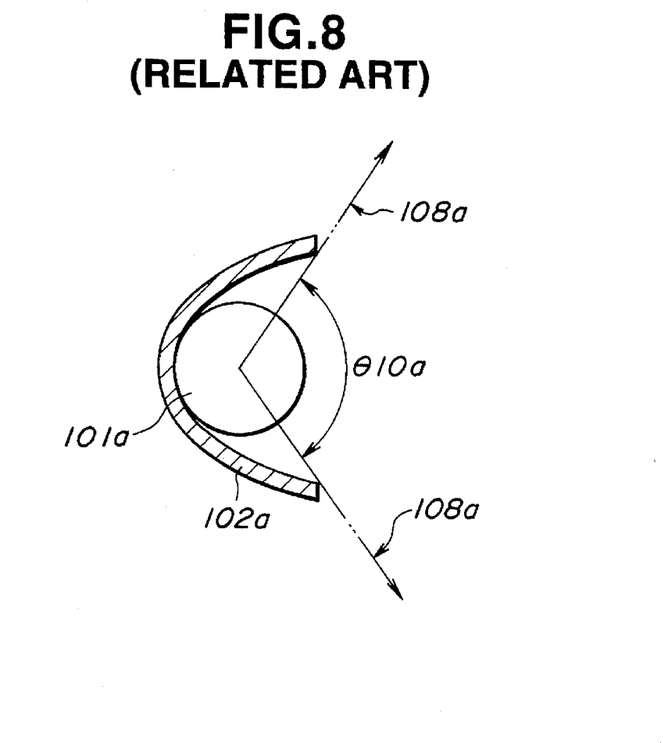
FIG. 8 is a longitudinal cross-sectional view schematically showing a prior flashing device reduced in size.

However, in such a general flashing device as shown in FIG. 7 the illuminating angle θ10 of the direct light 108 is capable of covering a photographing angle of view when the reflector 102 is large in size, while, with the flashing device itself being reduced in size, a reflector 102a thereof is also reduced in size as illustrated in FIG. 8, whereby an illuminating angle θ10a thus obtained becomes wide so that direct light 108a from a flashing discharge tube 101a is widely diffused to result in an illumination range exceeding the photographing angle of view. Accordingly, a problem exists in that illumination light loss will occur by reason of the light diffusion from the flashing discharge tube 101a.

Figure 9:
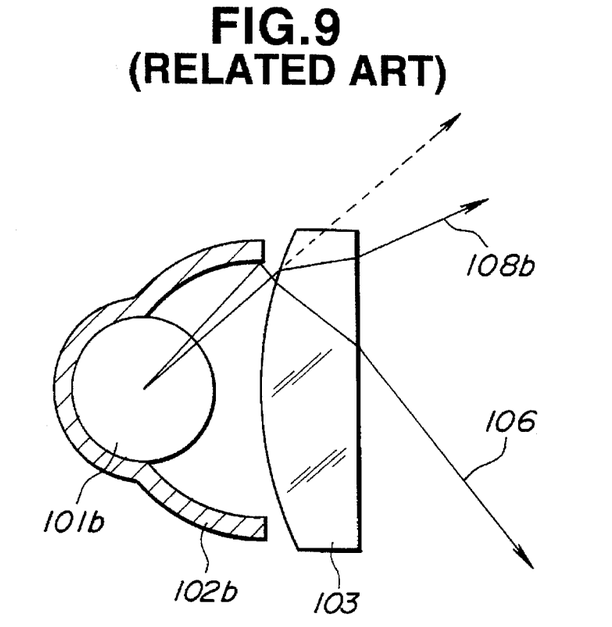
FIG. 9 is a longitudinal cross-sectional view schematically showing a small-size flashing device in which a conventional optical panel is incorporated.

Therefore, as illustrated in FIG. 9, an optical panel 103 whose inner surface has a convex configuration may be placed in front of a flashing discharge tube and reflector so as to refract light directly advancing to a photographic object for the control of the illumination light loss. In this case, direct light 108b from a flashing discharge tube 101b is adapted to be refracted through the optical panel 103 so as to be directed at within the illuminating angle with improved convergent performance. On the contrary, light reflected on a reflector 102b results in being refracted through the optical panel 103 before proceeding out of the photographing angle of view (light 106), whereby difficulty is encountered to efficiently lead the light from the flashing discharge tube 101b into the photographing angle of view, thus producing illumination light loss.

Figure 10:
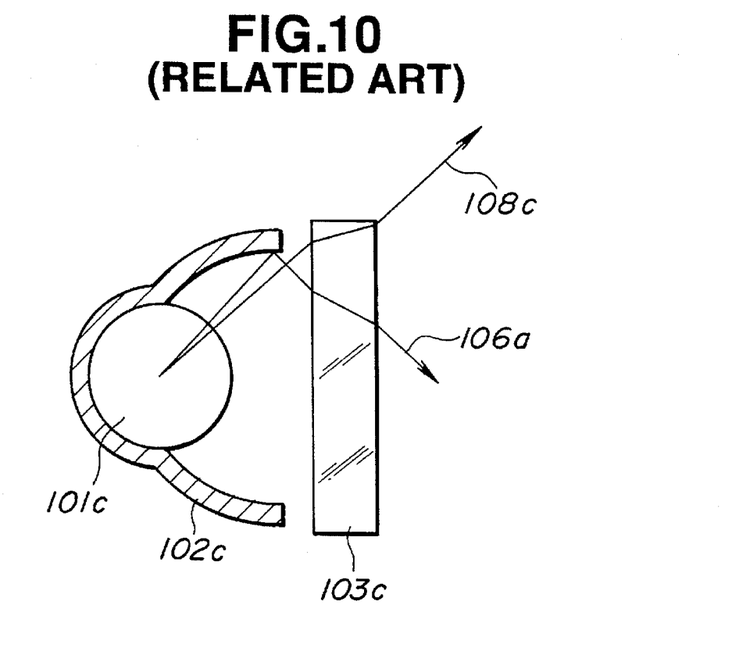

On the other hand, when as shown in FIG. 10 a plate-like optical panel is disposed in front of a flashing discharge tube and reflector, the light 106a emitted from the flashing discharge tube 101c before reflected on the reflector 102c is refracted through the optical panel 103c so as to advance into the photographing angle of view, while illumination is made such that direct light 108c from the flashing discharge tube 101c is refracted out of the photographing angle of view by means of the optical panel 103c. This causes illumination light loss.

For these reasons, there is a problem which arises with small-size flashing devices having the optical panels 103, 103c as shown in FIGS. 9 and 10, in that difficulty is experienced in simultaneously controlling the direct light 108b, 108c and reflected light 106, 106a.

Figure 11:
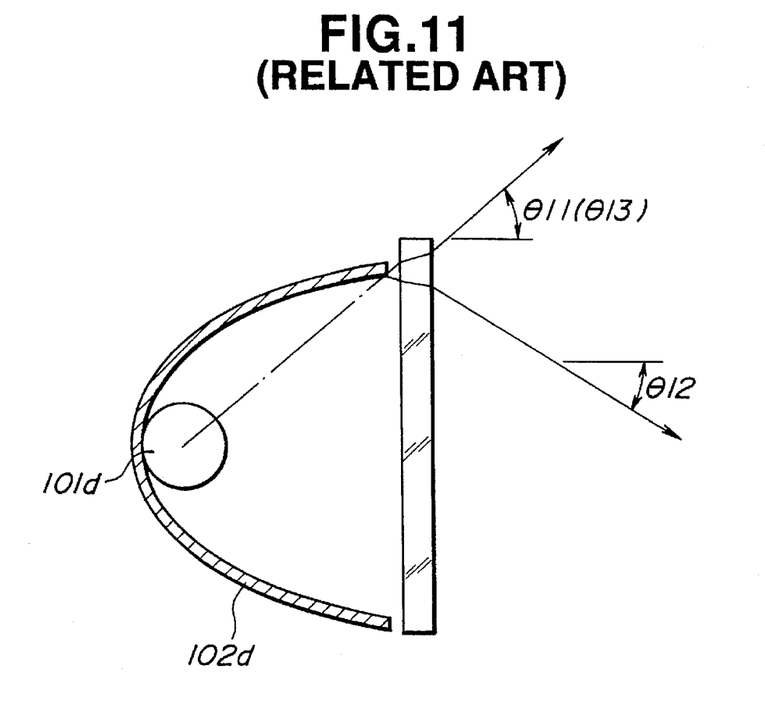
FIG. 11 is a longitudinal cross-sectional view schematically showing a flashing device including a conventional optical panel, and further illustrating another example of a general flashing device.
Figure 12:
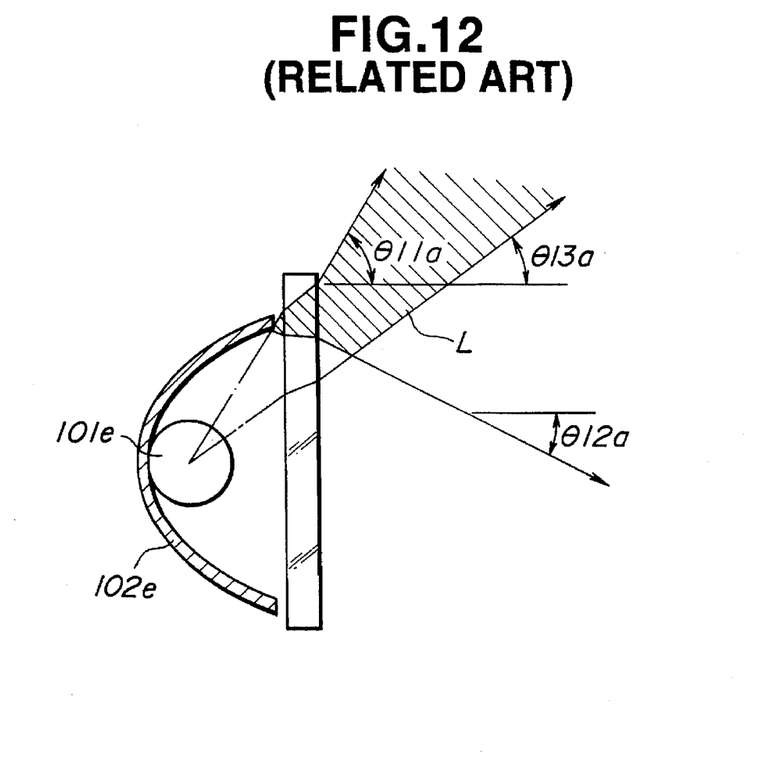
FIG. 12 is a longitudinal cross-sectional view schematically showing a flashing device including a conventional optical panel, and further illustrating an example of size-reduction of the FIG. 10 device.

Moreover, for the purpose of size-reduction of a flashing device as shown in FIG. 11 wherein a reflector 102d is set so that the angle θ11 of direct light from a flashing discharge tube 101d and the angle θ12 of reflected light therefrom provide illumination within a photographing angle of view θ13, that is, in a case where reflector 102d shown in FIG. 11 is arranged to be shortened in depth as a reflector 102e as shown in FIG. 12 and the reflector 102e is disposed so that the angle θ12a of reflected light is less than an illuminating angle θ13a, the angle θ11a of the outermost portion of direct light from a flashing discharge tube 101e becomes considerably wider than a desired illuminating angle θ13a. Thus, this creates a problem in that illumination light loss is developed in an area L indicated with oblique lines in FIG. 12.

Figure 13:
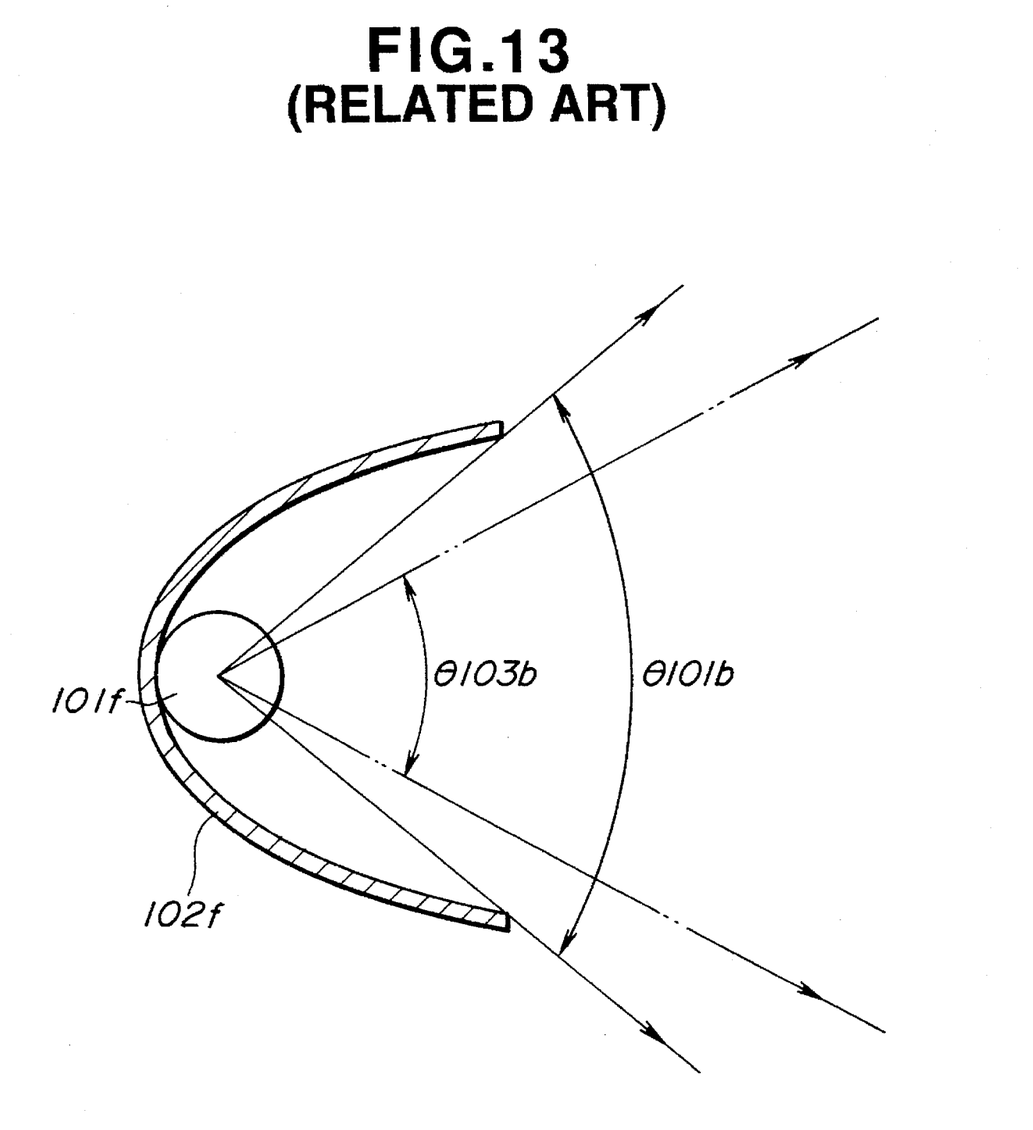
FIG. 13 is an illustration of an illuminating angle in a conventional small-size flashing device.

In other words, when as illustrated in FIG. 13 an illuminating angle θ101b made between a line connecting the center of a flashing discharge tube 101f with an upper end portion of a reflector 102f and a line connecting the center of the flashing discharge tube 101 with a lower end portion thereof is larger than a desired illuminating angle θ103b, the loss of illumination light will occur.

Furthermore, according to the means disclosed in the Japanese Laid-Open Utility Model No. 145030 of 1981, a problem also exists in that said means provides only the control of light distribution in a longitudinal direction of the reflector, but does not provide effective utilization of illuminating light in a transverse direction of the reflector.

Additionally, according to the means disclosed in the Japanese Laid-Open Patent Application No. 138438 of 1992, a problem also exists in that the frontage of the reflector becomes large because of placing a prism at its circumferential portion.

OBJECTS SUMMARY OF THE INVENTION

It is therefore an object of the present invention to provide an optical panel for use in a flashing device which, irrespective of the flashing device being small in size, is capable of separately controlling direct light and reflected light of distributed light of illumination light from a flashing discharge tube to lead the direct light and reflected light into a desired photographing angle of view, thus more effectively improving its converging performance without causing illumination light loss for the arrangement of the optical panel.

A brief description will be made in terms of this invention. According to a feature of this invention, in a flashing device wherein light emitted from a flashing discharge tube is converged through a reflector and led to a photographic object for illustration, an optical panel is disposed in front of the flashing discharge tube and reflector to control the light distribution characteristic in transverse directions perpendicular to the axis of the flashing discharge tube. This optical panel provides different optical characteristics at its central portion and circumferential portion in a lateral direction at right angles to the axis of the flashing discharge tube.

These and other objects and advantages of this invention will become more obvious upon the following detailed description.

According to this invention, there is provided an optical panel for an flashing device permitting a higher efficiency. That is, in a small-size flashing device an optical panel having different optical characteristics at its circumferential and central portions is located ahead of the flashing discharge tube and reflector, making it possible to separately control the direct and reflected light of illumination light from the flashing discharge tube so as to lead the light to a region within the photographing angle of view, thereby effectively allowing improvement of converging performance without loss of illumination light.

BRIEF DESCRIPTION OF THE DRAWINGS

The above, as well as other objects and features of the present invention will become more readily apparent from the following detailed description of the preferred embodiments taken in conjunction with the accompanying drawings in which:

FIG. 10 is a longitudinal cross-sectional view schematically showing a small-size flashing device in which another conventional optical panel is built in;

DETAILED DESCRIPTION OF THE INVENTION

Figure 1:
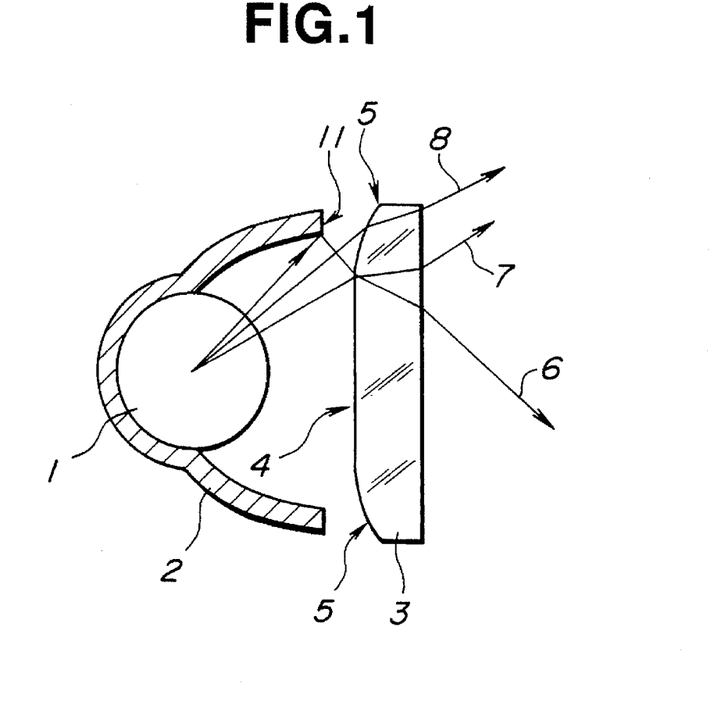
FIG. 1 is a longitudinal cross-sectional view schematically showing a flashing device according to a first embodiment of this invention.

Referring to FIG. 1, there is illustrated a flashing device according to a first embodiment of the present invention.

As shown in FIG. 1, this flashing device is composed of a flashing discharge tube 1, a hat-like reflector 2 and an optical panel, which optical panel 3 is made of glass, plastic or like materials. In addition, on the inner surface (flashing discharge tube 1 side) of the optical panel 3, the panel central portion 4 and panel circumferential portion 5 arranged in transverse directions normal to the illumination axis of the flashing discharge tube 1 are made so as to have different optical characteristics, respectively. The optical characteristic of the panel circumferential portion 5 has a greater curvature in the positive direction, as compared with the panel central portion 4.

In the flashing device of the first embodiment thus arranged, of the light emitted from the flashing discharge tube 1, direct light 7 advancing forwardly without reflecting on the reflector 2 passes through a vicinity of the central portion 4 of the optical panel 3 before impinging upon a photographic object existing within the photographing angle of view.

On the other hand, the outermost light 6 reflected on an edge portion 11 of the reflector 2 passes through a vicinity of central portion 4 of the optical panel 3 before advancing toward the photographic object within the photographing angle of view.

In addition, the outermost direct light 8 of the direct light proceeding directly and forwardly without reflecting on the reflector 2 is incident on the panel circumferential portion 5 and refracted toward the illumination axis side of the flashing discharge tube 1, then advancing to the photographic object within the photographing angle of view.

Accordingly, the direct light 7, 8 and reflected light 6 all travel within the photographing angle of view, i.e., a desired illuminating angle.

As described above, according to the first embodiment, with the central portion 4 and circumferential portion 5 of the optical panel 3 along transverse directions perpendicular to the illumination axis of the flashing discharge tube 1 being made so as to have different optical characteristics, it is possible to effectively achieve, without loss, the illumination directed to the photographic object within a desired illuminating angle (photographing angle of view) even if the flashing device is small-sized, which flashing device converges the light from the flashing discharge tube 1 by means of the reflector 2.

Figure 2:
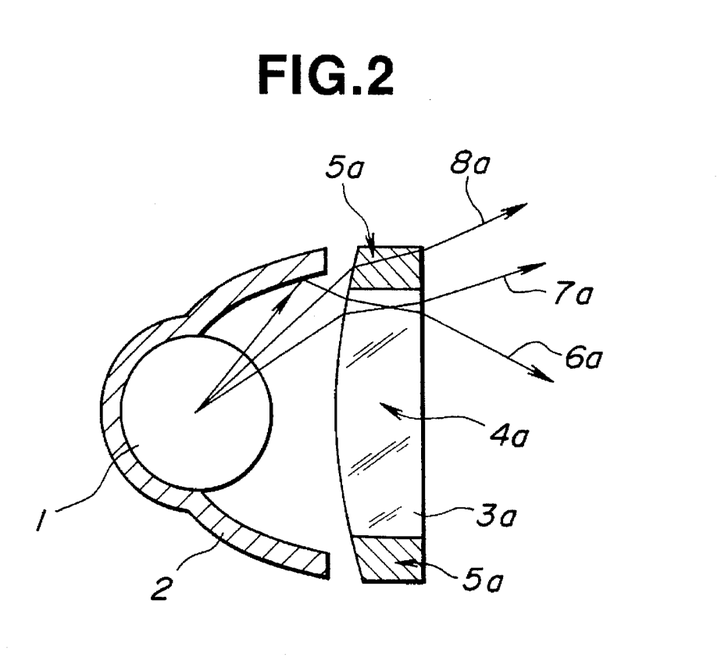
FIG. 2 is a longitudinal cross-sectional view schematically showing a flashing device according to a second embodiment of this invention.

FIG. 2 is an illustration of a flashing device according to a second embodiment of this invention.

In FIG. 2, a flashing device according to this second embodiment basically has the same structure as that of the above-described first embodiment, and comprises a flashing discharge tube 1, a reflector 2, and an optical panel 3a made of glass, plastic or like materials.

On the inner surface (the flashing discharge tube 1 side) of the optical panel 3a, a panel central portion 4a and panel peripheral portion 5a positioned in transverse directions perpendicular to the illumination axis of the flashing discharge tube 1 have different optical characteristics, i.e., refractive indexes, respectively. That is, as to an optical characteristic, the panel peripheral portion 5a has a greater refractive index than that of the panel central portion 4a.

With this arrangement, in the flashing device according to the second embodiment, direct light 8a, being incident on the peripheral portion 5a of the optical panel 3a to advance forwardly without reflecting on the reflector 2, is refracted through the panel peripheral portion 5a so as to be led toward the illumination axis of the flashing discharge tube 1 before being directed at a photographic object within the photographing angle of view.

On the other hand, the outermost light 6a reflected on an edge portion of the reflector 2 passes through a vicinity of central portion 4a of the optical panel 3a and, at the same time, is refracted toward the photographic object within the photographing angle of view.

Furthermore, direct light 7a directly forwardly proceeding without reflecting on the reflector 2 passes through a vicinity of the panel central portion 4a and is refracted to be led to the illumination axis of the flashing discharge tube 1 to reach the photographic object within the photographing angle of view.

Accordingly, with changes of the refractive index of the peripheral portion 5a of the optical panel 3a, of the light emitted from the flashing discharge tube 1, the direct light directly advancing forwardly without reflecting on the reflector 2 can be converged within a desired illuminating angle, thereby providing a flashing device having a higher efficiency but not containing useless light rays and loss of illumination in the desired illumination angle.

The refractive index from the panel central portion 4a to the panel peripheral portion 5a may be made to gradually change for the purpose of simplifying the machining of the optical panel 3a.

In the optical panels 3, 3a of the flashing devices according to the above-described first and second embodiments, the panel peripheral portions 5, 5a are exemplified to be formed to have a curvature in the positive direction on the flashing discharge tube 1 side, while it is also possible that the optical characteristic of the optical panel is made such that a curvature is created in the positive direction on its photographic object side. This can provide the same effect.

In addition, even if the optical panel is formed such that its flashing discharge tube 1 side and photographic object side have positive curvatures, it is also possible to offer the same optical characteristic.

Figure 3:
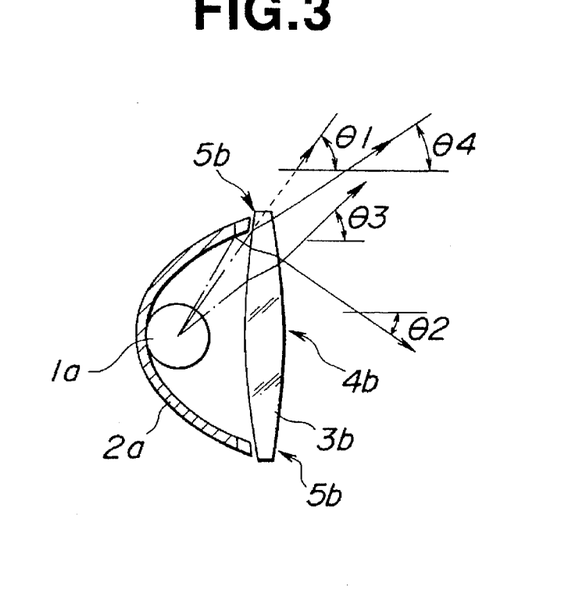
FIG. 3 is a longitudinal cross-sectional view schematically showing a flashing device according to a third embodiment of this invention.

FIG. 3 illustrates a flashing device according to a third embodiment of this invention, wherein the plate-like optical panel of the conventional small-size flashing device described with reference to FIG. 12 is replaced with an optical panel 3b which has different optical characteristics, i.e., refractive indexes, at its peripheral portion and central portion. For this reason, the basic arrangement thereof is the same as that of the above-described FIG. 12 flashing device, or the above-mentioned flashing devices according to the first or second embodiment.

As illustrated in FIG. 3, the optical panel 3b of the flashing device according to the third embodiment is constructed such that its panel peripheral portion 5b is different in optical characteristic (refractive index) from its panel central portion 4b, whereby both the light (illuminating angle θ2) emitted from a flashing discharge tube 1a and reflected by a reflector 2a and the refracted light (illuminating angle θ4) of direct light from the flashing discharge tube 1a come into the photographic angle of view, i.e., a desired illuminating angle θ3.

Thus, even in the flashing device according to the third embodiment, by means of the peripheral portion 5b of the optical panel 3b being adapted to be different in optical characteristic (refractive index) from the central portion 4b thereof, the illumination light loss portion L, i.e., the illumination light departing toward the outside of the desired illumination angle θ13a, can be directed to within the photographic angle of view due to the light distribution characteristic (refractive index, refractive angle θ4) of the peripheral portion 5b of the optical panel 3b and the light emitted from the flashing discharge tube 11a and reflected by the reflector 2a can be derived at the reflection angle θ2 from the vicinity of central portion 4b of the optical panel 3b so as to accurately make illumination of the photographic object within the illuminating angle.

That is, in a small-sized flashing device, by providing different optical characteristics for the peripheral portion 5b and central portion 4b of the optical panel 3b, the illumination light to be diffused to the peripheral portions or the illumination light to pass through the panel central portion 4 and to be diffused toward the peripheral portions are led to within the desired illumination angle θ3, thereby improving the converging performance and preventing loss of illumination light.

Figure 4:
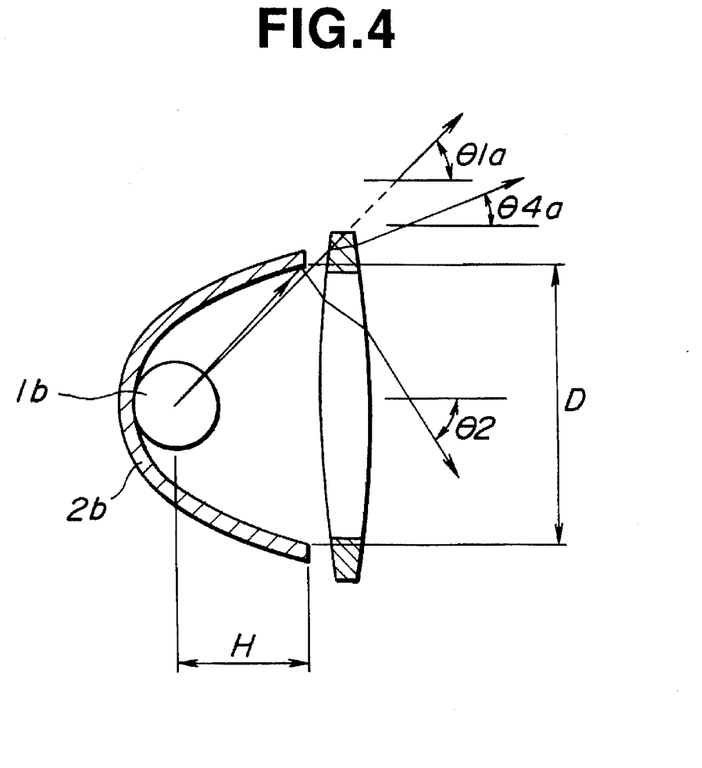
FIG. 4 is a longitudinal cross-sectional view showing one example of a modification of the flashing device according to the third embodiment of FIG. 3.

FIG. 4 shows a modification of the flashing device according to the third embodiment.

When as shown in FIG. 4 the depth dimension H from the center of a flashing discharge tube 1b to the frontage of a reflector 2b is smaller than ½ of the frontage dimension D of the reflector 2b, i.e., when H<D/2, the loss of illumination is further reduced.

For this reason, as shown in FIG. 4 the optical panel in the above-mentioned third embodiment, i.e., the optical panel 3b having the peripheral portion 5b and central portion 4b different in optical characteristic (refractive index) from each other, is located ahead of the flashing discharge tube 1b and reflector 2b.

Thus, even according to this modification, it is also possible to refract the light emitted from the flashing discharge tube 1 and incident on a vicinity of the panel peripheral portion and to converge and lead it to within the photographing angle of view, thus providing a flashing device with a high efficiency.

Figure 5:
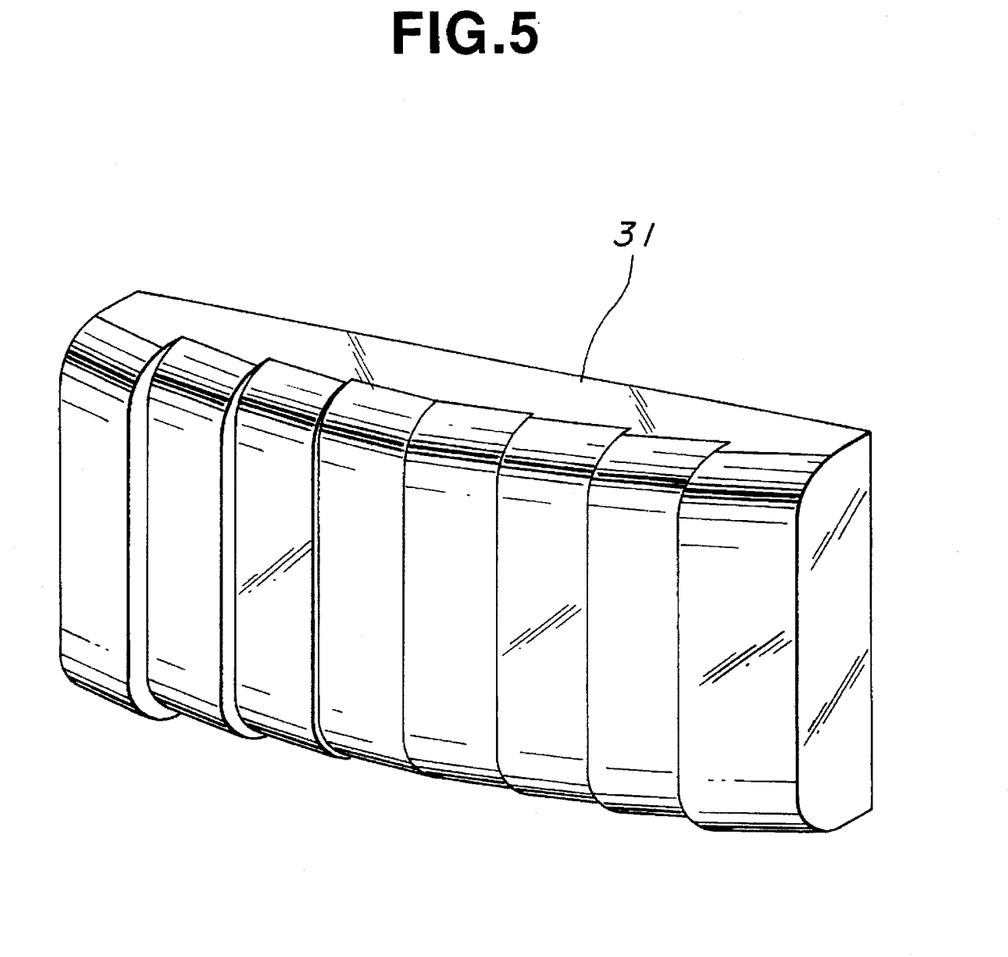
FIG. 5 is a perspective view of a Fresnel lens exemplifying an application of this invention.

The configurations of the optical panels described with reference to the respective embodiments, i.e., the configurations having different optical characteristics at their peripheral portions and central portions, as shown in FIG. 5, are applicable to Fresnel lens (converging lens) 31 or the like.

Figure 6:
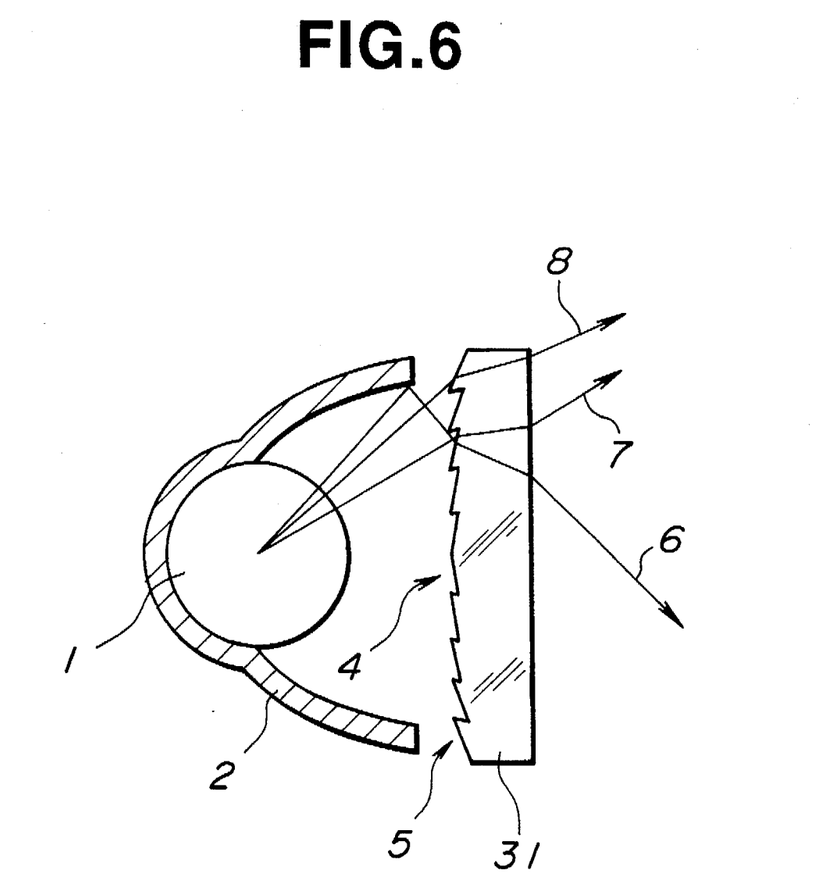
FIG. 6 is a longitudinal cross-sectional view schematically showing a flashing device according to a fourth embodiment of this invention.

FIG. 6 is an illustration of a flashing device according to a fourth embodiment of this invention. In the flashing device according to this fourth embodiment, instead of the optical panel in the foregoing first embodiment there is used the aforementioned Fresnel lens 31 having an optical control structure. The basic arrangement is the same as that of the flashing device of the aforesaid first embodiment and, therefore, the like components are marked with the reference numerals for the following brief description.

As shown in FIG. 6, this flashing device is made up of a flashing discharge tube 1, a reflector 2 and a Fresnel lens 31 serving as an optical panel. This Fresnel lens 31 is made of glass, plastic or like materials and has an optical control structure which can control the distribution of the illumination light even in a direction of the axis of the flashing discharge tube 1.

Further, on the inner surface (flashing discharge tube 1 side) of the Fresnel lens 31, a panel central portion 4 and peripheral portion 5 positioned in a transverse direction normal to the illumination axis of the flashing discharge tube 1 are made to have optical characteristics different from each other. Regarding the optical characteristic, the panel peripheral portion 5 has a greater curvature in the positive direction as compared with the panel central portion 4.

In the flashing device of the fourth embodiment thus arranged, as well as the foregoing first embodiment, all of direct light 7 advancing forwardly without reflected by the reflector 2, the outermost direct light 8 of the direct light 7, and the outermost light 6 reflected at the edge portion of the reflector 2 are controlled to be led to within the photographic angle of view, i.e., a desired illuminating angle.

As described above, according to this fourth embodiment, even in the case that the Fresnel lens 31 having different optical characteristics at its panel peripheral portion and central portion are employed as the optical panel, it is possible to effectively lead the illumination light from the flashing discharge tube 1 to a photographic object existing within the desired illuminating angle (photographing angle of view) without loss.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A flashing device for converging light from a flashing discharge tube through a reflector to lead converged light to a photographic object, said flashing device comprising:

an optical panel located in front of said flashing discharge tube and said reflector and controlling a light distribution in a transverse direction perpendicular to an axis of said flashing discharge tube, said optical panel having a central portion and peripheral portion positioned along said transverse direction perpendicular to the axis of said flashing discharge tube and said central portion and said peripheral portion having optical characteristics which differ from each other;

said different optical characteristics comprising refractive indexes at said central portion and said peripheral portion in said transverse direction perpendicular to the axis of said flashing discharge tube and which are different from one another.

2. A flashing device as set forth in claim 1, wherein said peripheral portion of said optical panel has a refractive index greater than said central portion thereof.

3. A flashing device as set forth in claim 1, wherein an optical characteristic of said optical panel is such that said refractive index gradually changes from said central portion to said peripheral portion.

4. A flashing device for converging light from a flashing discharge tube through a reflector to lead converged light to a photographic object, said flashing device comprising:

an optical panel located in front of said flashing discharge tube and said reflector and controlling a light distribution in a transverse direction perpendicular to an axis of said flashing discharge tube, said optical panel having a central portion and peripheral portion positioned along said transverse direction perpendicular to the axis of said flashing discharge tube and said central portion and said peripheral portion having optical characteristics which differ from each other;

said optical panel having different curvatures, defining said optical characteristic thereof, at said central portion and said peripheral portion in said transverse direction perpendicular to the axis of said flashing discharge tube.

5. A flashing device for converging light from a flashing discharge tube through a reflector to lead converged light to a photographic object, said flashing device comprising:

an optical panel located in front of said flashing discharge tube and said reflector and controlling a light distribution in a transverse direction perpendicular to an axis of said flashing discharge tube, said optical panel having a central portion and peripheral portion positioned along said transverse direction perpendicular to the axis of said flashing discharge tube and said central portion and said peripheral portion having optical characteristics which differ from each other;

said peripheral portion of said optical panel having a radius of curvature which is less than a radius of curvature of said central portion thereof.

6. A flashing device for converging light from a flashing discharge tube through a reflector to lead converged light to a photographic object, said flashing device comprising:

an optical panel located in front of said flashing discharge tube and said reflector and controlling a light distribution in a transverse direction perpendicular to an axis of said flashing discharge tube, said optical panel having a central portion and peripheral portion positioned along Said transverse direction perpendicular to the axis of said flashing discharge tube and said central portion and said peripheral portion having optical characteristics which differ from each other;

a curvature of a flashing discharge tube side surface of said peripheral portion of said optical panel has a radius of curvature which is smaller than a radius of curvature of said central portion thereof.

7. A flashing device for converging light from a flashing discharge tube through a reflector to lead converged light to a photographic object, said reflector being constructed to define an angle formed by a line extending between an edge portion of a frontage of said reflector and a center of an axis of said flashing discharge tube and a line passing through an optical axis of said reflector, said lines lying in a plane perpendicular to an axis of said flashing discharge tube, such that said angle exceeds a desired illumination angle range, and said flashing device further including an optical panel located in front of said flashing discharge tube and said reflector and having different optical characteristics at a central portion and a peripheral portion in said transverse direction perpendicular to the axis of said flashing discharge tube, the different optical characteristics of said optical panel varying gradually in the peripheral portion of said optical panel controlling distribution characteristics of said light to converge said light within said desired illumination angle range.

8. A flashing light-emitting device for a camera, comprising:

a flashing light-emitting tube having a cylindrical configuration and made to emit light;

a reflector for reflecting flashing light from said flashing light-emitting tube, said flashing light-emitting tube being located within said reflector and said flashing light being emitted from a rectangular-shaped flashing light-emitting opening formed by an open end of said reflector; and an optical panel for controlling illumination of said flashing light, said optical panel being placed at said rectangular flashing light-emitting opening and having a rectangular configuration fitting with said rectangular configuration of said flashing light-emitting opening, a peripheral portion of said optical panel along a longer side of said rectangular configuration having an optical characteristic which differs from other portions thereof, and said peripheral portion of said optical panel along the longer side of said rectangular configuration gradually changes shape.

9. A flashing light-emitting device as set forth in claim 8, wherein said optical panel has curvatures, at said peripheral portion along said longer side of said rectangular configuration and at said other portions which are different from one another, said curvatures defining said optical characteristics.

10. A flashing light-emitting device as set forth in claim 8, wherein said optical panel has refractive indexes, at said peripheral portion along said longer side of said rectangular configuration and said other portions which are different from one another, said refractive indexes defining said optical characteristics.

11. A flashing light-emitting device for a camera, comprising:

a flashing light-emitting tube having a cylindrical configuration and made to emit light;

a reflector for reflecting flashing light from said flashing light-emitting tube, said flashing light-emitting tube being located within said reflector and said flashing light being emitted from a rectangular-shaped flashing light-emitting opening formed by an open end of said reflector; and an optical panel for controlling illumination of said flashing light, said optical panel being placed at said rectangular flashing light-emitting opening and having a rectangular configuration fitting with said rectangular configuration of said flashing light-emitting opening, a peripheral portion of said optical panel along a longer side of said rectangular configuration having an optical characteristic which differs from other portions thereof, and said peripheral portion of said optical panel along a longer side of said rectangular configuration has a refractive index which changes gradually.

* * * * *